(12) United States Patent
High et al.

(10) Patent No.: US 9,654,734 B1
(45) Date of Patent: May 16, 2017

(54) VIRTUAL CONFERENCE ROOM

(71) Applicant: Wal-Mart Stores, Inc., Bentonville, AR (US)

(72) Inventors: Donald High, Noel, MO (US); John Paul Thompson, Bentonville, AR (US); David Winkle, Bella Vista, AR (US); Robert C. Taylor, Rogers, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 15/298,968

(22) Filed: Oct. 20, 2016

Related U.S. Application Data

(60) Provisional application No. 62/248,986, filed on Oct. 30, 2015.

(51) Int. Cl.
*H04N 7/14* (2006.01)
*H04N 7/15* (2006.01)
*H04N 13/00* (2006.01)
*H04N 13/02* (2006.01)
*H04N 13/04* (2006.01)

(52) U.S. Cl.
CPC ......... *H04N 7/157* (2013.01); *H04N 13/0059* (2013.01); *H04N 13/0278* (2013.01); *H04N 13/0479* (2013.01)

(58) Field of Classification Search
CPC ....................................................... H04N 7/14
USPC ......... 348/14.01, 14.08, 14.12, 14.09, 14.07, 348/14.11
See application file for complete search history.

(56) References Cited

U.S. PATENT DOCUMENTS

| 5,495,576 | A | 2/1996 | Ritchey | |
|---|---|---|---|---|
| 2004/0125120 | A1 | 7/2004 | Weiner | |
| 2008/0266294 | A1* | 10/2008 | Osman | G01B 11/2513 345/426 |
| 2009/0119604 | A1 | 5/2009 | Simard et al. | |
| 2013/0162632 | A1 | 6/2013 | Varga et al. | |
| 2014/0232816 | A1 | 8/2014 | Wilson | |
| 2015/0213650 | A1 | 7/2015 | Barzuza | |
| 2016/0343164 | A1* | 11/2016 | Urbach | G06T 19/006 |

(Continued)

OTHER PUBLICATIONS

6A1793B2 Cisco TelePresence Live Holographic Video Conferencing, Cisco, 2011 https://www.youtube.com/watch?v=jMCR9xep81E.

(Continued)

*Primary Examiner* — Olisa Anwah
(74) *Attorney, Agent, or Firm* — Patterson Thuente Pedersen, P.A.

(57) ABSTRACT

A virtual conferencing system includes a 3D scanner in a local region and a camera. A scan of the local region and images are received and combined to make a model that is transmitted to a remote region. A remote model from the remote region is combined and rendered for a user in the local region. A reference point in the local region is mapped to a reference point in the remote region. The remote model is oriented with respect to the local region according to the reference points. Object in the remote and local regions may be filtered from models that are transmitted. Interactions with virtual objects in the local region may invoke modification virtual objects. Modifications may be transmitted to the remote region and superimposed on real objects corresponding to the virtual objects.

20 Claims, 7 Drawing Sheets

(56) References Cited

U.S. PATENT DOCUMENTS

2016/0360970 A1* 12/2016 Tzvieli .................. A61B 5/015
2016/0364015 A1* 12/2016 Send ....................... G01S 17/32

OTHER PUBLICATIONS

Brain Programmers World First Holographic Tele-Conferencing System with Patented Technology Gaurav Vats, 2015 https://www.youtube.com/watch?v=pD692WIY1m0.
3D Hologram Meetings? Unbelievable Real Telepresence DVEtelepresence,2010https://www.youtube.com/watch?v=jAIDXzv_fKA.
Project HoloLens: Our Exclusive Hands-OnWithMicrosoft's Holographic Goggles | WIREDhttp://www.wired.com/2015/01/microsoft-hands-on/.
Security Room http://gubaba.org/mi2/wiki/index.php5?title=Security_Room.
Combined Search and Examination Report, Application No. GB1615187.0, dated Feb. 17, 2017, 8 pages.

* cited by examiner

VIRTUAL CONFERENCE ROOM

CROSS-REFERENCE TO RELATED APPLICATIONS

This application claims the benefit of U.S. Provisional Patent Application 62/248,986, filed Oct. 30, 2015, and titled "Virtual Conference Room", the entire contents of which are hereby incorporated herein by reference.

BACKGROUND

Field of the Invention

This invention relates to systems and methods for providing virtual reality experiences.

Background of the Invention

The cost and time required by travel is avoided in many instances by having video conferences. Video conferences may even have multiple participants in multiple locations. Although video conferencing provides many of the benefits of a face-to-face meeting, it is still limited in its ability to allow the same kinds of interactions that are permitted during an in-person conference.

The systems and methods disclosed herein provide an improved approach for conducting meetings among remote participants using virtualization technologies.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
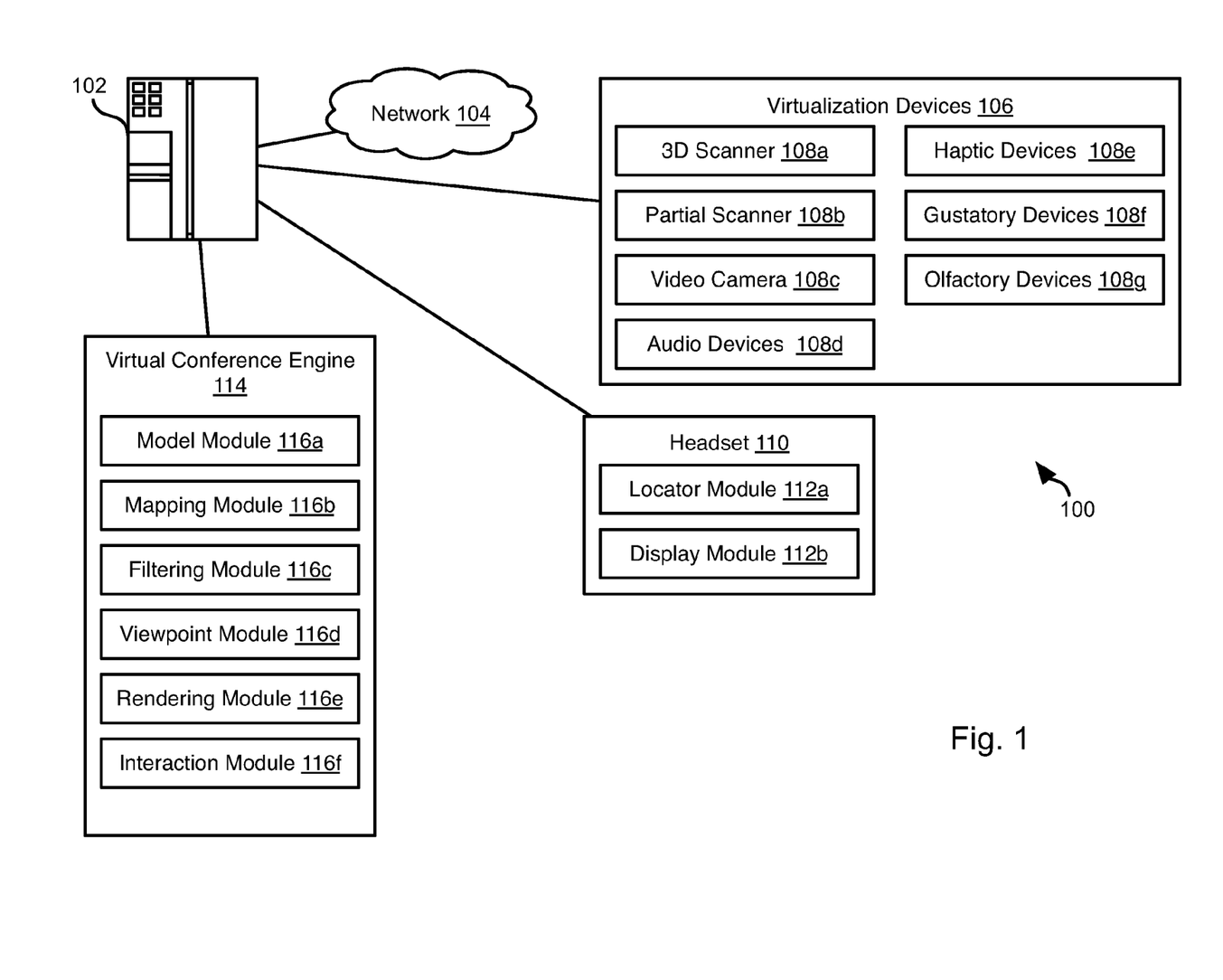
FIG. 1 is a schematic block diagram of a network environment suitable for implementing embodiments of the invention.

Referring to FIG. 1, a network environment 100 may be used to implement methods as described herein. The environment 100 may include a server system 102 associated with one or both parties of a virtual conference. For example, all parties of a virtual conference as described herein may communicate with the server system 102. Alternatively, separate server systems 102 may be remote from one another with each party of the virtual conference communicating through a separate server system 102, the separate server systems 102 communicating with one another by means of a network 104. The network 104 may be a local area network (LAN), wide area network (WAN), the Internet, or any other type of network.

The methods disclosed herein provide large amounts of computing resources, accordingly the server system 102 preferably has multiple processors and networking bandwidth sufficient to receive, transmit, and process the virtual conferencing data according to the methods disclosed herein.

Each space participating in a virtual conference may include a set of virtualization devices 106 for facilitating sensing of the each space for virtualization elsewhere and for virtualizing a remote space in the each space. For example, the virtualization devices 106 may include a three-dimensional (3D) scanner 108a. The 3D scanner 108a may advantageously be a laser scanner capable of performing a 360-degree scan of a space. For example, the 3D scanner 108a may be embodied as the FARO FOCUS 3D laser scanner or other type of laser scanner.

The virtualization devices 106 may further include partial scanners 108b. The partial scanners 108b may have a smaller field of view than the 3D scanner 108a but provide faster processing times to obtain a 3D model using captured data. For example, the partial scanners 108b may be optical scanners. In some embodiments, multiple partial scanners 108b are used such that the combined fields of view of the partial scanners 108b are equal to all or substantially all (e.g., 90%) of the field of view of the 3D scanner. In some embodiments, the partial scanners 108b are embodied as the FARO FREESTYLE3D SCANNER or some other optical 3D scanner known in the art.

The virtualization devices 106 may include one or more video cameras 108c. The video cameras 108c may be positioned and oriented to capture images of the same local region as the 3D scanner 108a and partial scanners 108b. The images captured by the cameras 108c may then be mapped to three-dimensional point clouds measured using the scanners 108a, 108b to generate a three-dimensional model of the local region that overlays image date over the point cloud thereby providing a visually authentic representation of the local region. The manner in which the three-dimensional point clouds and image data is combined may be performed according to any method known in the art.

The virtualization devices 106 may include audio devices 108d, including a microphone for detecting sound in the local region and speakers for playing back sounds recorded in a remote region.

The virtualization devices 106 may include haptic devices 108e, including a haptic feedback device, such as a glove that is capable of one or both of detecting contact of an object with the glove and simulating contact with the glove. The haptic devices 108e may include any haptic glove or other haptic feedback device known in the art.

The virtualization devices 106 may include gustatory devices 108f, including one or both of a device for detecting chemicals in the local region and a device for simulating the taste of chemicals in the local region. For example, the gustatory devices 108f may include the DIGITAL LOLLIPOP device.

The virtualization devices 106 may include olfactory devices 108g, including one or both of a device for detecting smells in the local region and a device for simulating smells in the local region. The olfactory devices 108g may include any devices for detecting or simulating smells known in the art.

A virtual reality headset 110 may also be coupled to the server system 102. The headset 110 may include any virtual reality headset known in the art such as the OCCULUS RIFT, MICROSOFT HOLOLENS, ZEISS VR ONE, GOGGLE CARDBOARD, and the like. The virtual reality headset 110 may include a locator module 112a including any location mechanism known in the art to determine the location and orientation of the headset 110 in the local region. For example, the headset 110 may include a GPS receiver, compass, accelerometer, or other device enabling the headset 110 to detect its position and orientation and/or changes in its position and orientation. The headset 110 may also have one or more optically-recognizable targets affixed thereto that enable determination of the position and orientation of the headset 110 using one or more cameras (e.g. images captured using video cameras 108c). The position and orientation (hereinafter "viewpoint") of the headset 110 may be transmitted to the server system 102, which will then render images of a model according to the user's viewpoint in the local region.

The headset 110 may further include a display module 112b. As known in the art, a virtual reality headset 110 presents two images of a scene from two different viewpoints, e.g. from a left eye and a right eye. These two images are presented simultaneously to the right and left eye, which the brain will then interpret as viewing of a three-dimensional scene. Accordingly, the display module 112b may receive a stream of image pairs and display each pair of images to the wearer of the headset 110. The image pairs may be received from the server system 102. Alternatively, the server system 102 may transmit a model to the headset 110, which then determines the headset's position and orientation and renders the two images based on the model.

The server system 102 may execute or access a virtual conference engine 114. The virtual conference engine 114 may include a model module 116a programmed to periodically receive point clouds from one or both of the 3D scanner 108a and partial scanner 108b and from the video camera 108c. The model module 116a then combines these to generate a model of the local region that simulates both the 3D shape of objects in the local region as well as their visual appearance (e.g. color). As described in greater detail below, the partial scanners 108b may provide scans more often than the 3D scanner 108a and the outputs of the partial scans may be used to update a model created using a point cloud from the 3D scanner 108*a*.

The virtual conference engine 114 may include a mapping module 116*b*. The mapping module 116*b* maps at least one of a point and two or more dimensions in the local region to a point and one or more dimensions in a remote region. In particular, the model created by the model module 116*a* may define a local coordinate space. The mapping module 116*b* maps this local coordinate space to a remote coordinate space of a model generated of the remote region. The mapping may be accomplished by relating a single point in the local coordinate space to a single point in the remote coordinate space. The mapping may further include mapping two dimensions (e.g. vertical and horizontal) in the local coordinate space to corresponding dimensions in the remote coordinate space. In this manner, each point in the local coordinate space may then be related to or translated to a position in the remove coordinate space and vice-versa.

The reference point may be specified by users of the system, e.g. by placing an optically recognizable target or a target having a recognizable 3D shape that is detected automatically in the model of the local region. The reference point may be specified manually by a user selection using a pointing device of a point in the model of the local region. The reference point may be automatically selected by analyzing the model of the region, e.g. a corner where the floor and two walls meet may be selected automatically as the reference point. The manner in which the reference point of the remote region is selected may be performed in the same manner as for the local region.

The virtual conference engine 114 may include a filtering module 116*c*. In some embodiments, the model generated by the model module 116*a* may be processed to remove objects that are not relevant. For example, walls, floors, and ceilings may be removed from the model to obtain a filtered model. The filtered model may then be transmitted to the remote region for display, thereby reducing the amount of data required to be transmitted. In some embodiments, the filtering module 116*c* may be programmed to receive user selection of objects and remove the selected objects from the model.

The virtual conference engine 114 may include a viewpoint module 116*d*. The viewpoint module 116*d* determines and current viewpoint of the headset 110 and relates this viewpoint to the model. Specifically, the location and orientation of the headset 110 as determined using the locator module 112*a* is mapped by the viewpoint module 116*d* to a position and orientation within the local coordinate space. Using the mapping module 116*b*, the position and orientation of the headset 110 is also determined with respect to the remote coordinate space.

The virtual conference engine 114 may include a rendering module 116*e*. The rendering module 116*e* generates image pairs for display in the headset 110. The image pairs are images of the model viewed from the point of view determined by the viewpoint module 116*e*. The rendering module 116*e* may incorporate people and objects from a model of one or more remote regions into the model prior to rendering as discussed in greater detail below with respect to FIGS. 3, 4, 5A and 5B.

The virtual conference engine 114 may include an interaction module 116*f*. The interaction module 116*f* receives inputs from users in the local and remote regions. The inputs may be received by detecting movements of the user's hands, an input device (mouse, keyboard), motion sensing system (e.g. MICROSOFT KINECT), or other input device. In response to interactions, actions may be invoked, such as the manipulation of virtualized real objects (objects that are present in one of the local and remote regions but represented as a virtual object in the another region) or purely virtual objects that are not present in any region. The function of the interaction module 116*f* is described in greater detail below with respect to FIGS. 6, 7A, and 7B.

Figure 2:
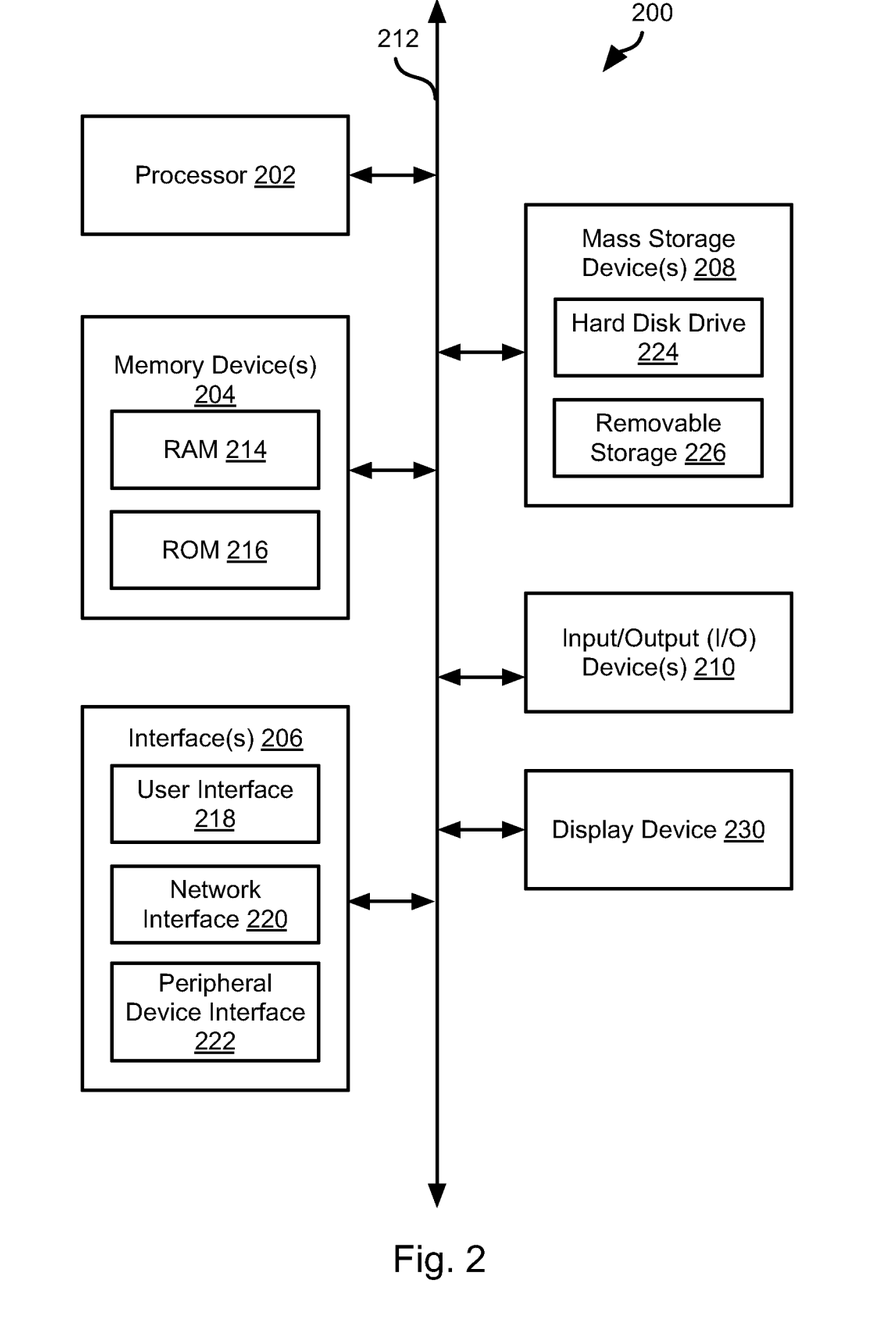
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The server system 102, virtualization devices 106, and headset 110 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, a tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
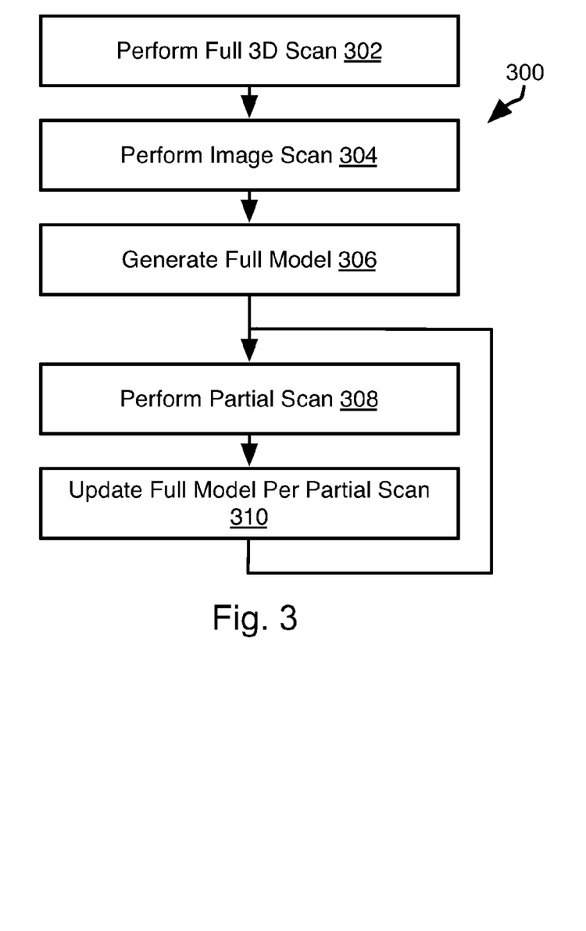
FIG. 3 is a process flow diagram of a method for scanning a space in accordance with an embodiment of the invention.

Referring to FIG. 3, the illustrated method 300 may be executed by the server system 102. The method 300 may include performing 302 a full 3D scan with the 3D scanner 108a. Although the scanner 108a is referenced throughout in the singular, in some embodiments the full 3D scan of step 302 may be performed by multiple scanners 108a. Accordingly, references herein to the scanner 108a may be interpreted as including one scanner 108a or multiple scanners 108a.

Performing a full scan may include scanning a complete field of view of the 3D scanner 108a although this may not include an entire room or local region in which the 3D scanner 108a is located. The result of the scan 302 may be a point cloud received by the server system 102 from the scanner 108a, including a set of three-dimensional coordinates measured using the scanner 108a. The coordinates may be defined with respect to a scanner coordinate space and may be retained in that coordinate space or transformed to a different coordinate space.

The method 300 may further include performing an image scan 304, i.e. taking one or more images of the local region using one or more cameras 108c. The fields of view of the one or more cameras 108c preferably overlap substantially all (e.g. 90%) of the field of view of the scanner 108a.

The method 300 may include generating a model 306 using the full scan of step 302 and the image scan 304. As noted above, this may include wrapping or overlaying the images of step 304 over the point cloud obtained from step 302 in order to obtain a model that has both the three-dimensional attributes of the point cloud and the visual attributes (e.g. color) of the images. The manner in which the point cloud and images are combined may be performed using any method known in the art.

The method 300 may further include periodically performing 308 partial scans and updating 310 the model from step 306 according to the partial scans. Performing 308 the partial scans may include performing partial scans using the partial scanners 108b. The partial scanners 108b may be optical scanners or may output a point cloud that can be combined with image data to create a model. In such embodiments, performing 308 partial scans may include taking one or more pictures of the field of view of the partial scanners 108b and combining them to create the partial model. The partial scans may be performed 310 periodically according to a predetermined rate or may be performed in response to sensing of motion in the field of view of the partial scanner 108b, such as using a motion sensor coupled to the partial scanner 108b or server system 102.

The result of the partial scan 308 is a partial model in a partial coordinate space of the partial scanner 108b. This partial model may be transformed to the coordinate space of the full model and added to the full model 306. For example, a partial scanner 108b may have a volume of the local region in its field of view. Accordingly, the full model may be updated 310 by replacing the portion of the full model corresponding to this volume with the partial model.

The mapping of the partial coordinate space to the scanner coordinate space may be performed based on prior calibration of the partial scanner 108b and 3D scanner 108a. Specifically, a target or other object may be placed in the local region and detected using both scanners 108a, 108b. By transforming the location of the object in the partial coordinate space to the location of the object in the scanner coordinate space, the transformation required to map one coordinate space to the other may be determined.

Steps 308, 310 may be repeated periodically throughout a virtual conference. In some embodiments, full scans using the 3D scanner 108 may also be performed periodically but at a slower rate than the partial scans.

Figure 4:
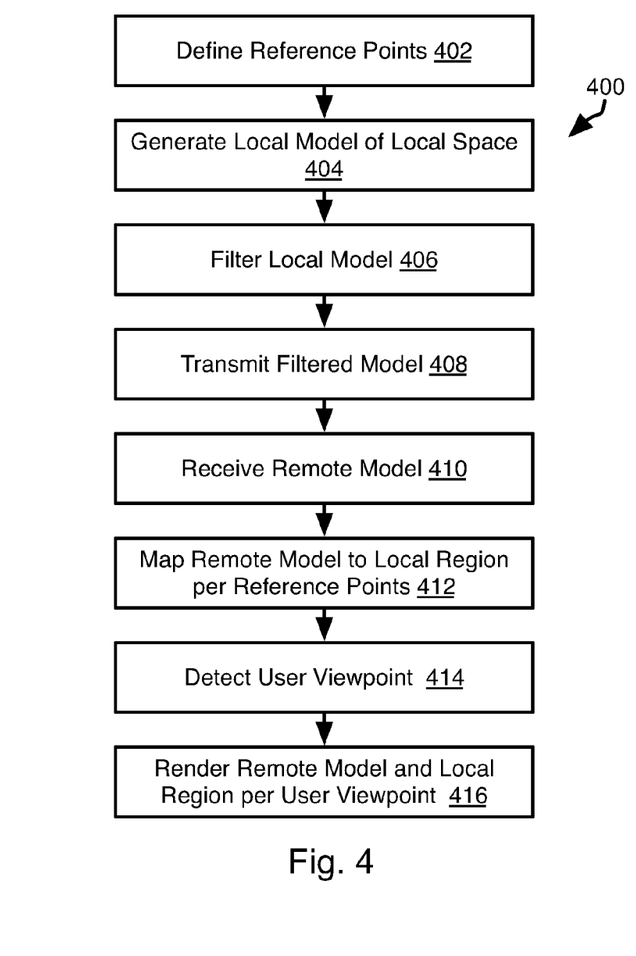
FIG. 4 is a process flow diagram of a method for conducting a virtual conference in accordance with an embodiment of the present invention.

Referring to FIG. 4, the illustrated method 400 may be executed by a server system 102 to conduct a virtual conference. The method 400 may represent the functionality with respect to one location participating in a conference. A remote location participating may execute the method 400 simultaneously either using the same server system 102 or a separate server system 102.

The method 400 may include defining reference points 402. This may include receiving or selecting a point in the local region and receiving points from one or more remote regions. The reference points may be defined as three-dimensional coordinates. The reference point for the local region may be a point in the scanner coordinate space and the reference points received from remote regions may be coordinates in scanner coordinate spaces of scanners located in the remote regions.

The method 400 may further include generating 404 a local model of the local space, this may include executing the method 300 of FIG. 3 to obtain a full model or an updated full model using partial scans. The local model may also be filtered 406. As noted above, this may include removing walls, floors, ceilings, and other mundane objects that are not relevant to the conference. The objects removed from the local model may be selected manually or identified automatically. For example, flours, walls, and ceilings may be identified by the server system based on their flat shape and large extent relative to the local region.

The filtered model may then be transmitted 408 to a remote region for display to participants in the remote region. The server system 102 may likewise receive 410 a remote model from the remote region, the remote model being a model or filtered model generated with respect to the remote region in the same manner as the filtered model of steps 404 or 406. The models transmitted and received at steps 408, 410 may be partial models, i.e. only portions of the models that have changed relative to a previously transmitted model. In this manner, latency may be reduced.

The method 400 may include mapping 412 the remote model to the filtered model using the reference points. In particular using the local reference point and remote reference point, a transformation required to transform the remote reference point to the local reference point is determined. This transformation is then applied to the remote model to map 412 it to the scanner coordinate space of the local region. The transformed remote model and filtered model are then combined to obtain a combined model.

The method 400 may further include detecting 414 the viewpoint of one or more users in the local region. This may include detecting the viewpoint of one or more headsets 110 in the local region as discussed above. The combined remote and filtered model from step 412 is then rendered 416 for the users in the local region according to the viewpoints detected at step 414. In particular, for each headset 110, the viewpoint thereof is transformed to the scanner coordinate space and a pair of images of the combined model from that viewpoint in scanner coordinate space is rendered. The pair of images rendered from slightly different viewpoints corresponding to a viewer's right and left eyes. This pair of images is then sent to the headset 110 and displayed by the headset 110.

The method 400 may be repeated throughout the conference. During execution of the method 400, sounds detected in the local region may be transmitted to the remote region and vice-versa.

Figure 5A:
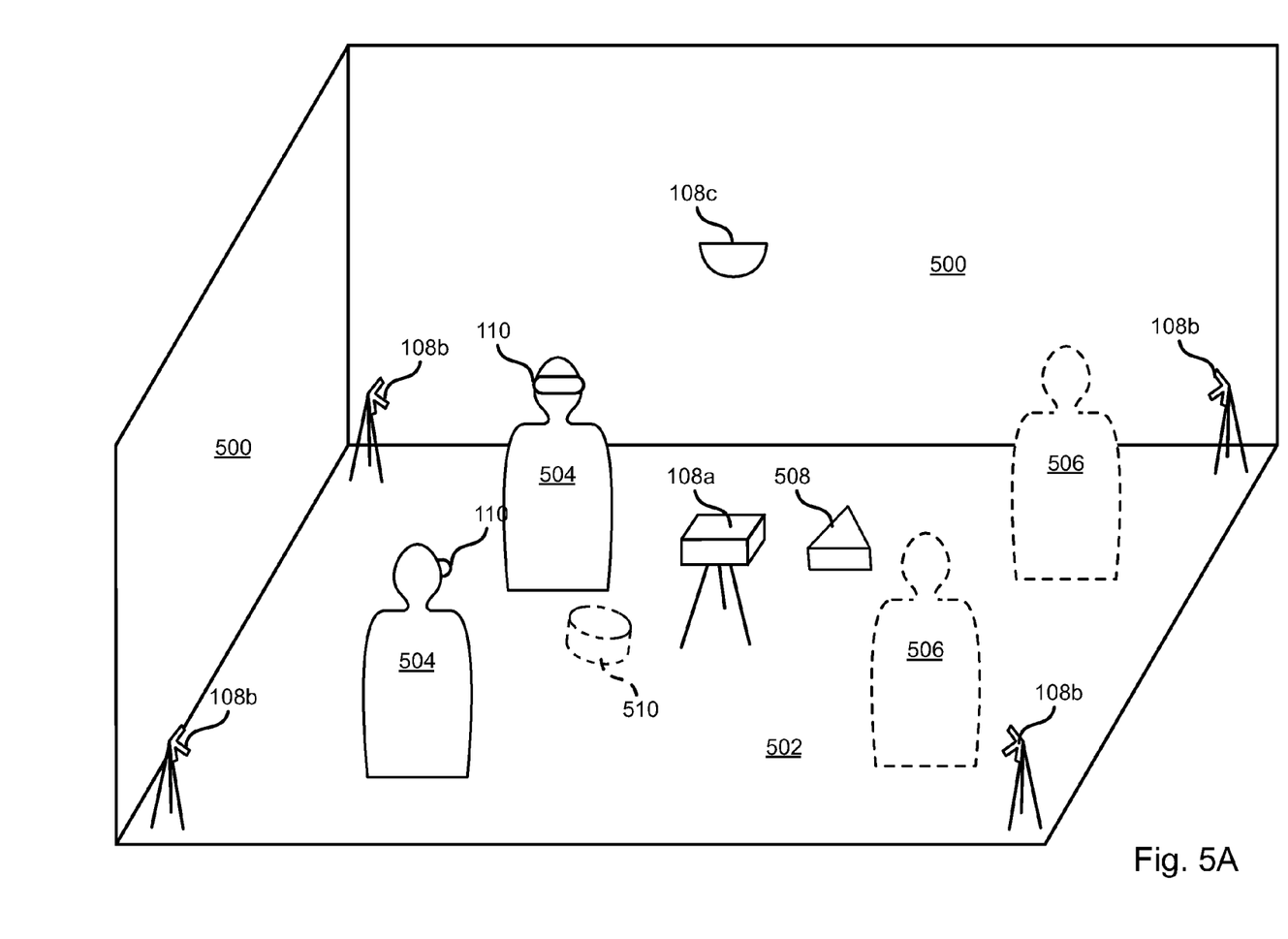
FIGS. 5A and 5B are diagrams illustrating remote spaces conducting a virtual conference in accordance with an embodiment of the present invention.
Figure 5B:
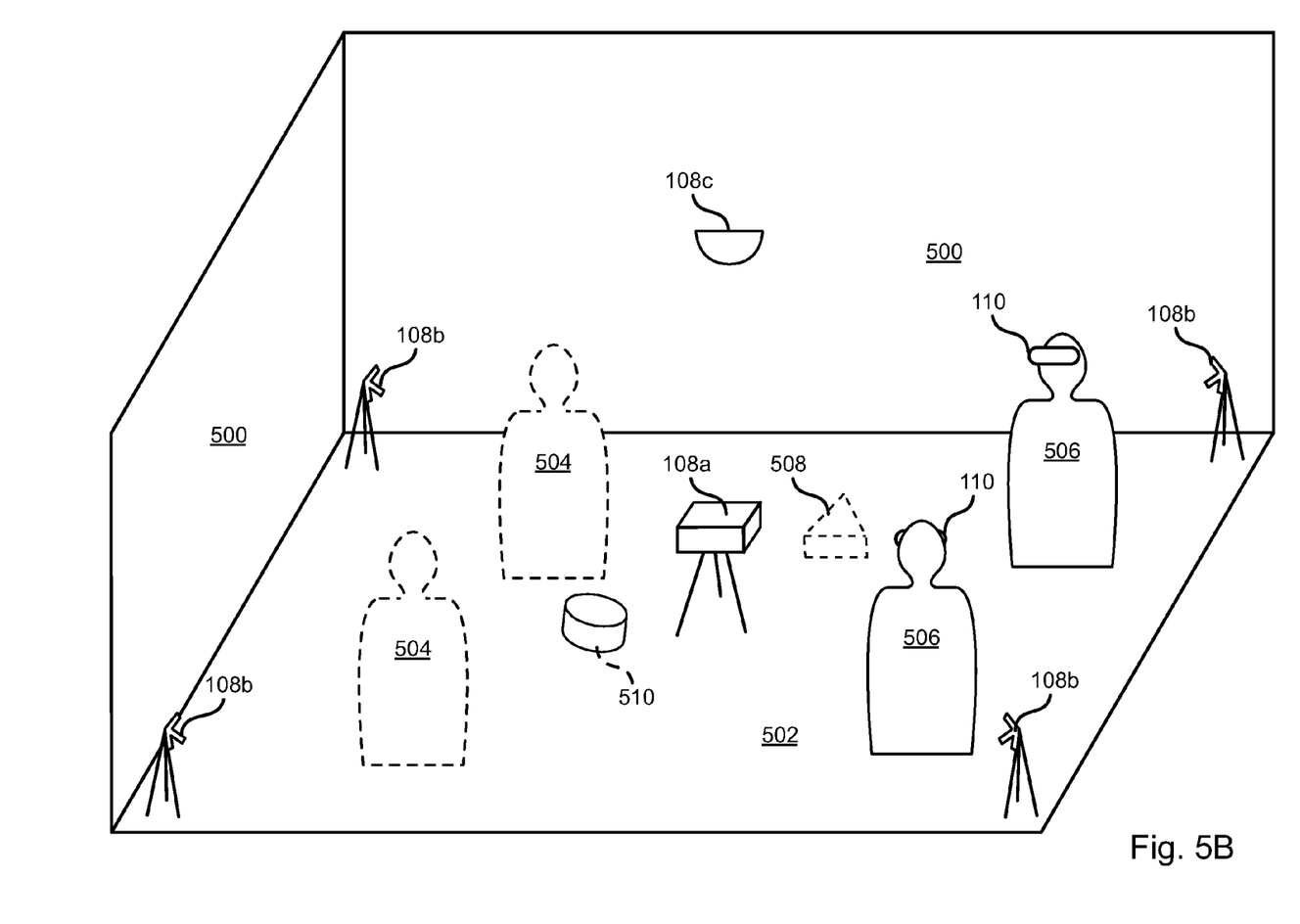

FIG. 5A illustrates a local region with equipment and user's present and FIG. 5B illustrates a remote region. As is apparent, the scanners 108a, 108b are arranged in the room to scan some or all of the room. Although the local region is an enclosed space in this example, open outdoor spaces or large indoor spaces exceeding the range if other scanners 108a, 108b may also be used. Accordingly, the local region may simply be defined as the space that is scanned by both types of scanners 108a, 108b.

The video camera 108c may be located in the region. As noted above, the video camera 108c may include multiple cameras. Multiple video cameras 108c may be arranged around the local region in order to capture substantially all of the fields of view of the scanner 108a and scanners 108b. In the illustrated embodiment, the video camera 108c is a 360-degree camera mounted in an elevated position within the region.

The walls 500 and floor 502 of the local region may be in the field of view of some or all of the scanners 108a, 108b but removed from any model transmitted for display in the remote region.

Users 504 are located within the local region and wear headsets 110. Users 506 are located in one or more remote regions and the dotted representations thereof shown in FIG. 5A indicate the location of virtual images of the users 506 that will be displayed in the headsets 110 of the users 504. In particular, virtual images of the users 506 will be part of the remote model received and combined with the filtered model.

Objects 508 may be located in the local region and be scanned and virtual models thereof transmitted to the remote region. Likewise, objects 510 in the remote region may be scanned and included in the remote model. Virtual representations of the objects 510 will therefore be rendered in the headsets 110 of the users when located within the field of view thereof as determined based on the viewpoint of the headsets 110.

As shown in FIG. 5B, the users 504 are represented as virtual objects in a combined model by headsets 110 worn by users 506 in the remote region. Likewise, the object 510 is a real object in the remote region whereas the object 508 is now represented as a virtual object in the remote region.

Figure 6:
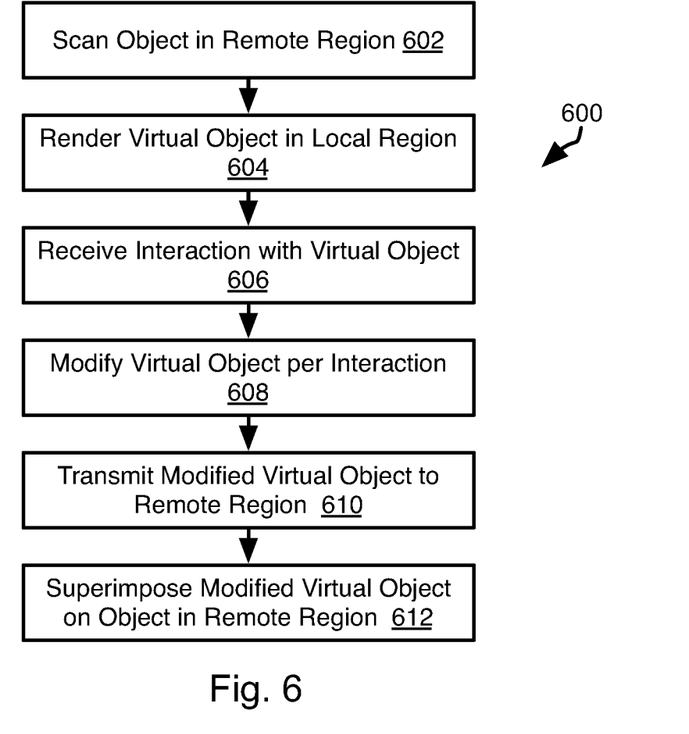
FIG. 6 is a process flow diagram of a method for interacting with objects in a virtual conference in accordance with an embodiment of the present invention.
Figure 7A:
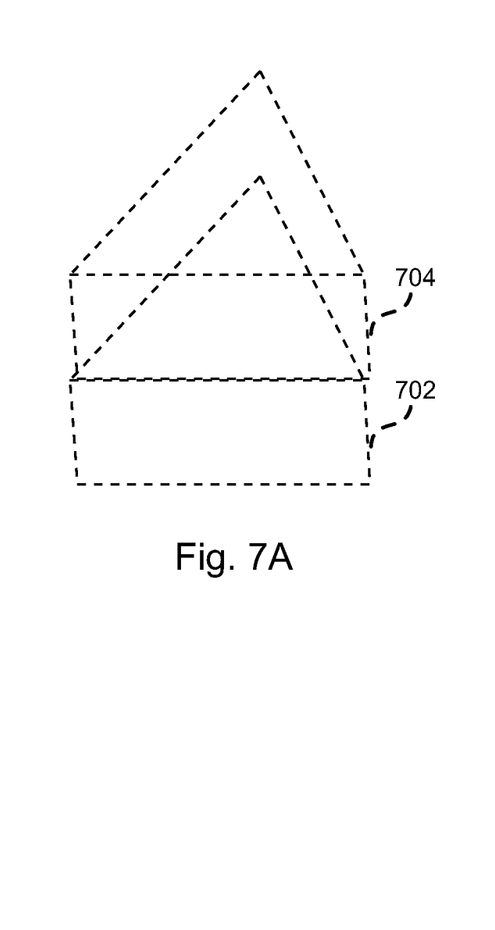
FIGS. 7A and 7B are diagrams illustrating representations of an object in a virtual conference in accordance with an embodiment of the present invention.
Figure 7B:
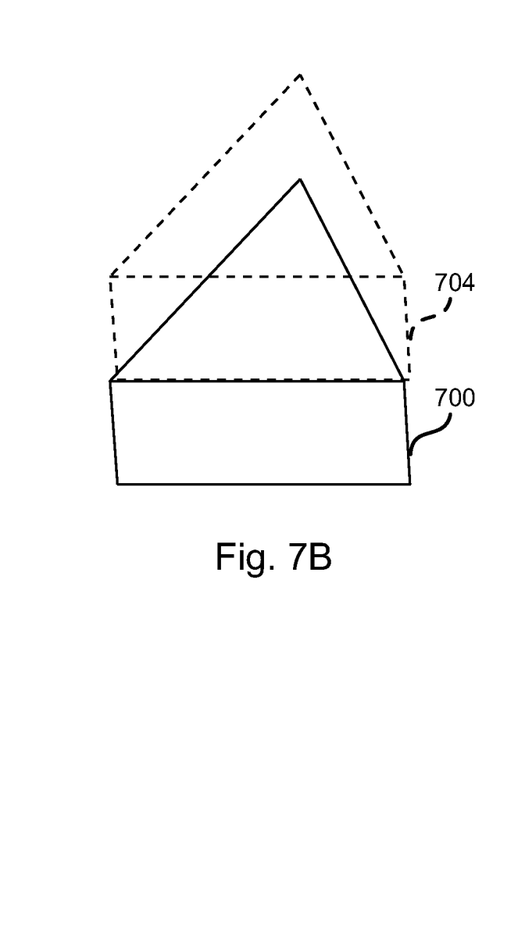

Referring to FIG. 6 and FIGS. 7A and 7B, the illustrated method 600 may be executed by the server system 102 to facilitate interaction among remote participants in a conference. The method 600 may include scanning 602 an object in the remote region and rendering 604 a virtual object in the local region using data (point cloud and image data). Scanning 602 and rendering 604 may be performed as part of executing the method 400 of FIG. 4.

The method 400 may further include receiving 606 interaction with the virtual object. For example, motion of a user's hand in proximity to the virtual object (e.g. using MICROSOFT KINECT sensors), inputs to a keyboard, movement of a pointing device, or other interactions referencing the virtual object may be detected. In response to the received 606 interactions, the virtual object may be modified 608. For example, an interaction may include a user transferring a virtual representation of a part into proximity to a machine (the virtual object). The virtual object may then be modified by adding the part to the machine in a position and orientation instructed by the user, i.e. according to user movements of the virtual representation of the part.

The virtual object as modified may be transmitted 610 to the remote region and rendered such that the modifications to the virtual object are superimposed 612 on the real object in the remote region, i.e. a user viewing the real object through a headset 110 will view the modifications to the virtual object superimposed on the real object in the images presented to the user.

The method 600 may be used to implement the following use case. A first person (Bob) in the local region may be viewing a machine in the remote region and a part to the machine in the remote region in the hand of a second person (Sue). Bob can reach out to the holographic image of the part in Sue's hand. Bob could invoke copying of the part and thereby create a holographic image of the part "held" in Bob's hand and rendered in both the local and remote regions. Bob may then invoke movement of the holographic copy of the part to the virtual representation of the machine and place it on the representation. Accordingly, Sue will see the real machine in the remote region and the holographic image of the part on the machine as well as the real part still in her hand. Sue can now either manipulate the holographic image or the real part in her hand, both of of which can still be seen by Bob as virtual objects.

In addition to interactions with real objects, interactions may be received with respect to virtual objects that are not present in either the local or remote regions. For example, a user may invoke display of a virtual object stored in a storage device, where the virtual object is a result of a previous scanning of a real object or a purely computerized model. Interaction and modification with subsequent display of the modified object may then be performed in the same manner as described above with respect to the method 600 of FIG. 6.

Referring Specifically to FIGS. 7A and 7B, a real object 700 is scanned in the remote region and rendered in the local region as virtual object 704. Interactions are received in the local region that instruct the server system to add virtual modification 704 to the virtual object 704. The virtual modification 704 is transmitted to the remote region and rendered in the remote region superimposed on the real object 700 in the same relation to the real object 700 as the virtual modification 704 has to the virtual object 702 in the local region.

The systems and methods disclosed herein enable multiple beneficial uses such as:
    Conducting product reviews of merchandise without having to be physically present
    Viewing variations of physical products (modify size, shape, color, etc.)
    Collectively working on projects with objects even though not present Conducting training to demonstrate and simulate behaviors and actions Preventing the spread of colds or sickness but yet be present Conducting simulations without the risk of injury with the use of 3D animation Conducting gaming with unreal characters The systems and methods disclosed herein further enable the implementation of digital holographic assistive agents (HAA) that could interact with human participants in the conference. The HAA could then help the conference participants bring in new human participants or engage available technology capabilities or reports into active conferences. The HAA could be humanoid or some other avatar that would represent an artificially intelligent program execution or data retrieval agent.

In some uses, an area or object of special interest in either region could be given a centralized focus. A participant perspective would provide the ability to "zoom in" or walk around a scanned or virtual object. Image enhancement would allow the resolution to be increased or decreased by changing proximity. For example a viewer could walk around to the back, move closer, zoom in to read a small label, examine texture or other detailed features. Alternatively an audience perspective could move the object on stage with viewers appearing to remain stationary, like a car on a turnstile stage. Virtual whiteboards could be added allowing virtual writing or drawing. Supplemental, information, effects, objects, video, news headlines or various backdrops can be virtually added to facilitate collaboration, enhance presentation effectiveness or increase artistic value.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for conferencing, the method comprising:
    defining, by a computer system comprising one or more computer devices, a first reference point in a first space and a second reference point in a second space, the second space being remote from the first space;
    receiving, by the computer system, a first three-dimensional scan of the first space;
    receiving, by the computer system, a first imaging scan of the first space;
    generating, by the computer system, a first three-dimensional model of the first space using the first three-dimensional scan and the first imaging scan;
    receiving, by the computer system, a second three-dimensional scan of the second space;
    receiving, by the computer system, a second imaging scan of the second space;
    generating, by the computer system, a second three-dimensional model of the second space using the second three-dimensional scan and the second imaging scan;
    transmitting, by the computer system, a first representation of the first three-dimensional model to a second user located in the second space, the first representation being oriented such that the first reference point in the first three-dimensional model is mapped to the second reference point; and
    transmitting, by the computer system, a second representation of the second three-dimensional model to a first user located in the first space, the second representation being oriented such that the second reference point in the second three-dimensional model is mapped to the first reference point.

2. The method of claim 1, wherein transmitting the first representation of the first three dimensional model comprises transmitting a first representation of a portion of the first three dimensional model corresponding to a section of the first space.

3. The method of claim 1, wherein transmitting the first representation of the first three dimensional model comprises transmitting a filtered representation of the first three-dimensional model, the filtered representation including only representations of objects present in the first space.

4. The method of claim 1, wherein the filtered representation includes representations of less than all of the objects present in the first space.

5. The method of claim 1, further comprising:
    receiving, by the computer system, interactions with a portion of the first representation from the second user in the second space;
    modifying, by the computer system, the portion of the first representation in response to the interactions to obtain a modified portion; and
    transmitting, by the computer system, the modified portion to the first user superimposed on the second representation at a position corresponding to the portion in the second space.

6. The method of claim 5, wherein receiving, by the computer system, the interactions with the portion of the first representation comprises receiving signals from a motion sensing system, the signals representing detected movements of a hand of the second user.

7. The method of claim 1, wherein receiving the first three-dimensional scan of the first scan comprises receiving the first three-dimensional scan from a first scanning device having a first scanning time, the method further comprising:
    receiving, by the computer system, subsequent to receiving the first three-dimensional scan, partial scans from one or more second scanning devices, the one or more scanning devices having second scanning times that are less than the first scanning time;
    updating, by the computer system, the first three-dimensional model according to the partial scans to obtain an updated first three-dimensional model; and
    transmitting, by the computer system, a representation of the updated first three-dimensional representation to the second user.

8. The method of claim 7, wherein the first scanning device is a laser scanner and the one or more second scanning devices comprise a plurality of optical scanners.

9. The method of claim 1, wherein transmitting the first representation of the first three-dimensional model to the second user located in the second space comprises transmitting the first representation to a headset worn by the second user.

10. The method of claim 9, further comprising:
    detecting, by the computer system, a position and orientation of the headset in the second user space; and
    rendering, by the computer system, the first representation of the first three-dimensional model from a viewpoint indicated by the position and orientation of the headset.

11. A system for conferencing comprising:
    a first scanning device located in a first space;

one or more processing devices and one or more memory devices, the one or more memory devices storing executable code effective to cause the one or more processing devices to:
  receive a first three-dimensional scan of the first space;
  receive a first imaging scan of the first space;
  generate a first three-dimensional model of the first space using the first three-dimensional scan and the first imaging scan;
  receive a definition of a first reference point in the first space;
  receive a second reference point for a second space remote from the first space;
  transmit a first representation of the first three-dimensional model to a second user located in the second space, the first representation being oriented such that the first reference point in the first three-dimensional model is mapped to the second reference point;
  receive a second representation of a second three-dimensional model; and
  render the second representation to a user in the first space such that the second representation is oriented such that the second reference point in the second three-dimensional model is mapped to the first reference point.

12. The system of claim 11, wherein the executable code is further effective to cause the one or more processing devices to transmit the first representation of the first three dimensional model by transmitting a first representation of a portion of the first three dimensional model corresponding to a section of the first space.

13. The system of claim 11, wherein the executable code is further effective to cause the one or more processing devices to transmit the first representation of the first three dimensional model by transmitting a filtered representation of the first three-dimensional model, the filtered representation including only representations of objects present in the first space.

14. The system of claim 11, wherein the filtered representation includes representations of less than all of the objects present in the first space.

15. The system of claim 11, wherein the executable code is further effective to cause the one or more processing devices to:
  receive interactions with a portion of the first representation from the second user in the second space;
  modify the portion of the first representation in response to the interactions to obtain a modified representation; and
  transmit the modified portion to the first user superimposed on a rendering of the second representation.

16. The system of claim 15, further comprising a motion sensing system;
  wherein the executable code is further effective to cause the one or more processing devices to receive the interactions with the portion of the first representation by receiving signals from the motion sensing system, the signals representing detected movements of a hand of the second user.

17. The system of claim 11, further comprising one or more second scanning devices, the second scanning devices having second scanning times that are less than a first scanning time of the first scanning device;
  wherein the executable code is further effective to cause the one or more processing devices to:
  receive, subsequent to receiving the first three-dimensional scan, partial scans from the one or more second scanning devices;
  update the first three-dimensional model according to the partial scans to obtain an updated first three-dimensional model; and
  transmit a representation of the updated first three-dimensional representation to the second user.

18. The system of claim 17, wherein the first scanning device is a laser scanner and the one or more second scanning devices comprise a plurality of optical scanners.

19. The system of claim 11, wherein the executable code is further effective to cause the one or more processing devices to render the second representation to the user in the first space by transmitting the a rendering of the second representation to a headset worn by the first user.

20. The system of claim 19, wherein the executable code is further effective to cause the one or more processing devices to:
  detect a position and orientation of the headset in the first user space; and
  render the second representation of the second three-dimensional model from a viewpoint indicated by the position and orientation of the headset.

* * * * *